US012700551B2

(12) United States Patent
Liang et al.

(10) Patent No.: US 12,700,551 B2
(45) Date of Patent: Aug. 4, 2026

(54) BUTTON STRUCTURE AND WEARABLE DEVICE

(71) Applicant: GOERTEK INC., Weifang (CN)

(72) Inventors: Liang Liang, Weifang (CN); Jianlei Ren, Weifang (CN); Junjie Pan, Weifang (CN); Huan Li, Weifang (CN); Yulong Shi, Weifang (CN)

(73) Assignee: GOERTEK INC., Weifang (CN)

( * ) Notice: Subject to any disclaimer, the term of this patent is extended or adjusted under 35 U.S.C. 154(b) by 263 days.

(21) Appl. No.: 18/579,530

(22) PCT Filed: Mar. 31, 2022

(86) PCT No.: PCT/CN2022/084409
§ 371 (c)(1),
(2) Date: Jan. 16, 2024

(87) PCT Pub. No.: WO2023/173501
PCT Pub. Date: Sep. 21, 2023

(65) Prior Publication Data

US 2024/0321527 A1 Sep. 26, 2024

(30) Foreign Application Priority Data

Mar. 15, 2022 (CN) ......................... 202210255219.0

(51) Int. Cl.
*H01H 3/12* (2006.01)
*H01H 3/32* (2006.01)
(Continued)

(52) U.S. Cl.
CPC ................ *H01H 3/12* (2013.01); *H01H 3/32* (2013.01); *H01H 9/0271* (2013.01); *H01H 2009/048* (2013.01)

(58) Field of Classification Search
CPC ......... H01H 2221/00; H01H 2221/008; H01H 2221/01; H01H 2221/012;
(Continued)

(56) References Cited

U.S. PATENT DOCUMENTS 10,936,071 B2 * 3/2021 Pandya .................. G04G 21/08

FOREIGN PATENT DOCUMENTS

CN 101046709 A 10/2007
CN 104656941 A 5/2015
(Continued)

OTHER PUBLICATIONS

International Search Report from International Application No. PCT/CN2022/084409 mailed Aug. 25, 2022.

*Primary Examiner* — Anthony R Jimenez
(74) *Attorney, Agent, or Firm* — Shih IP Law Group, PLLC

(57) ABSTRACT

Disclosed are a wearable device and a button structure applied thereto, the button structure comprises: a housing provided with a mounting chamber, a movable chamber communicated with the mounting chamber and a button hole communicating with the movable chamber; a trigger assembly provided in the mounting chamber; a button assembly comprising a button lever and an operating member, the button lever is movably disposed in the movable chamber, a part thereof is inserted into the mounting chamber and corresponds to the trigger assembly, a rotating groove is provided at an end of the button lever away from the trigger assembly, the operating member has a spherical shape and is movably disposed in the button hole, a part thereof is rotatably accommodated in the rotating groove, the operating member is pressed to drive the button lever for triggering the trigger assembly; and/or is rotated for triggering the trigger assembly.

15 Claims, 2 Drawing Sheets

(51) Int. Cl.
*H01H 9/02* (2006.01)
*H01H 9/04* (2006.01)

(58) Field of Classification Search
CPC ....... H01H 2221/016; H01H 2221/018; H01H 2223/01; H01H 2223/018; H01H 2231/028; H01H 2013/00; H01H 2013/02; H01H 2013/04; H01H 2013/50; H01H 2013/52; H01H 2013/525; H01H 3/00; H01H 3/02; H01H 3/04; H01H 3/12; H01H 3/32; H01H 3/46; H01H 3/50; H01H 3/54; H01H 9/00; H01H 9/02; H01H 9/0214; H01H 9/0271; H01H 1/16; H01H 21/00; H01H 21/02; H01H 21/22; H01H 2009/048; H01H 13/00; H01H 13/02; H01H 13/14; H01H 13/20; H01H 13/50; H01H 13/52; H01H 2223/004; G06F 3/01; G04G 21/00; G04G 21/08
USPC .......................................................... 200/341
See application file for complete search history.

(56) References Cited

FOREIGN PATENT DOCUMENTS

| | | | | | |
|---|---|---|---|---|---|
| CN | 105339871 A | * | 2/2016 | ............ | G04C 3/004 |
| CN | 112490053 A | | 3/2021 | | |
| CN | 113963971 A | | 1/2022 | | |
| JP | H09251826 A | | 9/1997 | | |

* cited by examiner

BUTTON STRUCTURE AND WEARABLE DEVICE

The present application claims a priority to a Chinese Patent Application No. 202210255219.0, entitled "BUTTON STRUCTURE AND WEARABLE DEVICE" filed with China Patent Office on Mar. 15, 2022, the entire contents of which are incorporated into the present application by reference.

TECHNICAL FIELD

The present disclosure relates to a technical field of intelligent wearable devices, and more particularly, to a button structure and a wearable device that applies the button structure.

DESCRIPTION OF RELATED ART

With the development of intelligent electronics industry, wearable devices are becoming more and more popular for users, and the functions thereof are more powerful than traditional watches. Most current wearable devices have 1 to 3 buttons, and switch of functions are mainly performed by pressing the buttons, resulting in a single function of the buttons, lacking of interest in operation, and poor user experience.

SUMMARY

A main object of the present disclosure is to provide a button structure and a wearable device, aiming at providing a button structure with diverse button functions and convenient for operation. The button structure is applied to the wearable device, which effectively improves the user experience.

In order to achieve the above object, the present disclosure provides a button structure applied to the wearable device, the button structure comprises:

- a housing provided with a mounting chamber, a movable chamber and a button hole communicating with the movable chamber, wherein the movable chamber is communicated with the mounting chamber;
- a trigger assembly provided in the mounting chamber; and
- a button assembly comprising a button lever and an operating member, wherein the button lever is movably disposed in the movable chamber, a part of the button lever is inserted into the mounting chamber for corresponding to the trigger assembly, a rotating groove is provided at an end of the button lever away from the trigger assembly, the operating member has a spherical shape, the operating member is movably disposed in the button hole, and a part of the operating member is rotatably accommodated in the rotating groove,
- wherein the operating member is pressed to drive the button lever for triggering the trigger assembly; and/or, the operating member is rotated for triggering the trigger assembly.

In an embodiment, the housing comprises:

- a shell provided with the mounting chamber and the button hole; and
- a fixing cover disposed in the mounting chamber and covers the button hole, and the fixing cover and the shell define the movable chamber communicating with the button hole.

In an embodiment, the fixing cover is provided with a first through hole communicating with the movable chamber and the mounting chamber, and the first through hole and the button hole are coaxially disposed, and Wherein one end of the button lever away from the rotating groove passes through the first through hole and inserts into the mounting chamber.

In an embodiment, the fixing cover is provided with a second through hole communicating with the movable chamber and the mounting chamber, and the second through hole is disposed adjacent to the button hole.

In an embodiment, the button lever is provided with an avoidance opening communicating with the rotating groove, and the avoidance opening is disposed at a position corresponding to the second through hole.

In an embodiment, the fixing cover is provided with an abutting step adjacent to the first through hole, and

- wherein the button assembly further comprises an elastic member disposed in the movable chamber, one end of the elastic member is elastically abutted to the abutting step, and another end of the elastic member is elastically abutted to the button lever;
- wherein, when the operating member is pressed, the button lever compresses the elastic member.

In an embodiment, the button lever comprises a rod section and a connecting section connected each other, one end of the rod section away from the connecting section passes through the first through hole and inserts into the mounting chamber, the connecting section is provided with the rotating groove and the avoidance opening, a shape of the rotating groove corresponds to a shape of the operating member, and the elastic member is sleeved on the rod section and is elastically abutted to an outer wall of the connecting section.

In an embodiment, an outer wall of one end of the rod section passing through the first through hole is provided with a slot, the button structure further comprises a circlip provided in the mounting chamber, the circlip is movably clamped in the slot, and when the operating member is pressed, the circlip is movable along a slot wall of the slot, and/or

- wherein the fixing cover is further provided with a stopper adjacent to the button hole, and when the operating member is pressed, the outer wall of the connecting section abuts with the stopper and is stopped by the stopper.

In an embodiment, the button structure further comprises at least one sealing ring, which is sandwiched between the button lever and a hole wall of the first through hole.

In an embodiment, the button lever and/or the hole wall of the first through hole is provided with a groove, the sealing ring is accommodated in the groove and partially protrudes from a notch of the groove.

In an embodiment, the trigger assembly comprises:

- a circuit board disposed in the mounting chamber;
- a trigger element disposed in the mounting chamber and directly opposite to the first through hole, the trigger element is electrically connected to the circuit board; and
- an optical sensor disposed on the circuit board and directly opposite to the second through hole, the optical sensor is electrically connected to the circuit board.

In an embodiment, the trigger assembly comprises an optical sensor, a surface of the operating member is provided with at least one identification area, and the optical sensor is configured to identify the identification area for triggering the trigger assembly.

In an embodiment, the identification area has a roughness different from that of the surface of the operating member, or wherein the identification area comprises at least one of text, number, and graphic on the surface of the operating member.

In an embodiment, the wearable device has functions of page scaling, page switching, dial style switching, sports mode switching, physiological detection mode switching and shortcut, the operating member is rotated to trigger the trigger assembly so as to control at least one of the functions of page scaling, page switching, dial style switching, sports mode switching, physiological detection mode switching and shortcut.

The present disclosure also provides a wearable device, comprising a device body and the button structure described above, and the housing of the button structure is connected to the device body.

In the button structure according to the technical solution of the present disclosure, the housing is provided with the mounting chamber, the movable chamber and the button hole communicating with the movable chamber, so that the mounting chamber is used to mount, fix and protect the trigger assembly, and the movable chamber is used to mount and fix the button assembly, so that the button lever of the button assembly is movably disposed in the movable chamber, and a part of the button lever is inserted into the mounting chamber for corresponding to the trigger assembly, a rotating groove is provided at an end of the button lever away from the trigger assembly and the operating member has a spherical shape, so that the operating member is movably disposed in the button hole, and a part of the operating member is rotatably accommodated in the rotating groove, that is, a part of the operating member of the button assembly passes through the button hole and is exposed outside of the housing, so that it is convenient for the user to press and/or rotate the operating member to realize the button operation function, and accordingly, when the operating member is pressed, the operating member drives the button lever to trigger the trigger assembly, thereby realizing the button operation function. When the user rotates the operating member, the operating member triggers the trigger assembly, thereby realizing the button operation function, such that the button structure has diverse button functions, is convenient for operation, and effectively improves the user experience.

BRIEF DESCRIPTION OF DRAWINGS

In order to more clearly illustrate the technical solutions in the embodiments of the present disclosure or the prior art, the drawings required to be used for the content of the embodiments or the prior art will be briefly introduced in the following. Obviously, the drawings in the following description are merely some embodiments of the present disclosure, and for those of ordinary skill in the art, other drawings can also be obtained from the structure as shown in the drawings without any creative effort.

Figure 1:
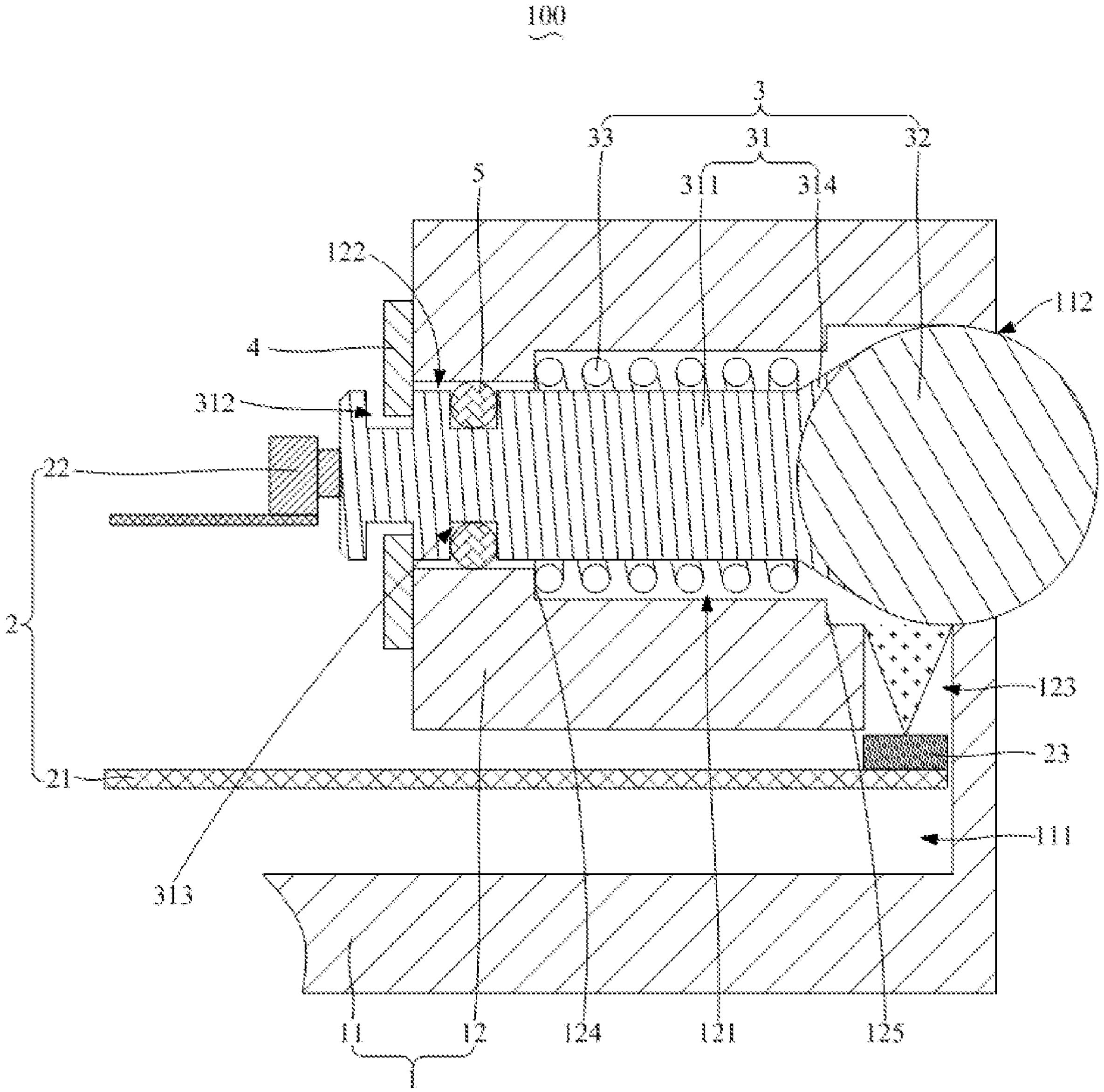
FIG. 1 is a schematic cross-sectional view of a button structure according to an embodiment of the present disclosure.

Explanation of reference numbers:

| Reference Numbers | Name | Reference Numbers | Name |
|---|---|---|---|
| 100 | button structure | 3 | button assembly |
| 1 | housing | 31 | button lever |
| 11 | shell | 311 | rod section |
| 111 | mounting chamber | 312 | slot |
| 112 | button hole | 313 | groove |
| 12 | fixing cover | 314 | connecting section |
| 121 | movable chamber | 315 | rotating groove |
| 122 | first through hole | 316 | avoidance opening |
| 123 | second through hole | 32 | operating member |
| 124 | abutting step | 33 | elastic member |
| 125 | stopper | 4 | circlip |
| 2 | trigger assembly | 5 | sealing ring |
| 21 | circuit board | 600 | device body |
| 22 | trigger element | 700 | watchband |
| 23 | optical sensor | 800 | wearable device |

The realization of objects, functional features and advantages of the present disclosure will be further described in conjunction with the embodiments and with reference to the accompanying drawings.

DETAILED DESCRIPTIONS

Technical solutions of embodiments of the present disclosure will be clearly and completely described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

It should be noted that all directional indications (such as up, down, left, right, front, back . . . ) in the embodiments of the present disclosure are only used to explain the relative positional relationships and movement conditions, etc. among the components in a specific posture (as shown in the drawings), and if the specific posture changes, the directional indication will also be changed accordingly.

Meanwhile, the meaning of "and/or" or "or/and" herein comprises three parallel schemes. For example, the meaning of "A and/or B" comprises a scheme A, a scheme B, or a scheme of both A and B.

In addition, contents referred to such as "first", "second", etc. in the present disclosure are only for descriptive purposes, and should not be construed as indicating or implying their relative importance or implicitly indicating the quantity of indicated technical features. Thus, the features defined with "first", "second", etc. may explicitly or implicitly comprise at least one of these features. In addition, the technical solutions of various embodiments of the present disclosure can be combined with each other, but it should be based on the fact that the technical solutions can be realized by those skilled in the art. When the combination of technical solutions is contradictory or cannot be realized, it should be considered that the combination does not exist and is not within the scope of protection required by the present disclosure.

With the development of intelligent electronics industry, wearable devices are becoming more and more popular for users, and the functions thereof functions are more powerful than traditional watches. Most current wearable devices have 1 to 3 buttons, switch of functions are mainly performed by pressing the buttons, and more flexible buttons may be rotated up and down for size scaling or sliding the display content up and down, resulting in a single function of the buttons, lacking of interest in operation, and poor user experience, which does not meet the development needs of intelligent devices.

Based on the above ideas and problems, the present disclosure provides button structure 100. It will be understood that the button structure 100 may be applied to a wearable device 800, an electronic device or other products that use button functions, and it is not limited herein. When the button structure 100 is applied to the wearable device 800, the wearable device 800 comprises a device body 600, and the device body 600 may be a dial, a display panel body, or the like. The device body 600 comprises a display screen disposed on a shell and electronic components or functional components and other structures disposed in the shell, the button structure 100 may be disposed in the shell of the device body 600, and a part of an operating member 32 of the button structure 100 is exposed to the outside of the shell, so that it is convenient for the user to realize the rotation and pressing functions by the exposed operating member 32. Of course, in other embodiments, the shell of the device body 600 and a housing 1 of the button structure 100 may be an integrated structure, and it is not limited herein.

Figure 2:
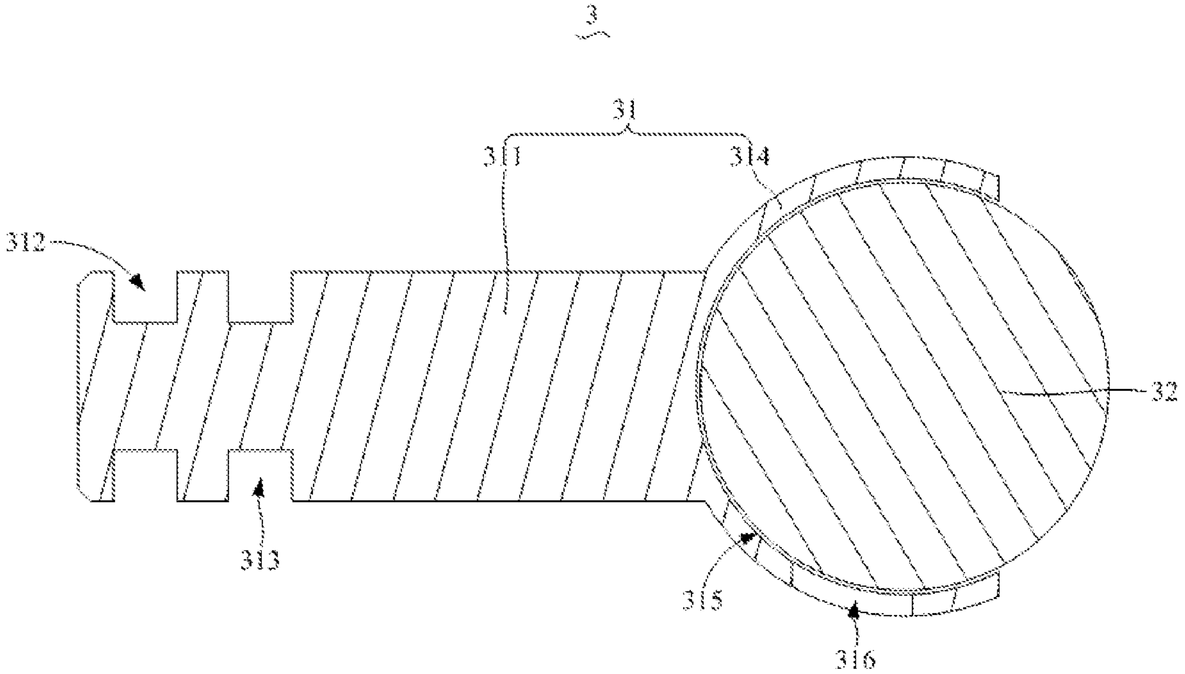
FIG. 2 is a partial schematic cross-sectional view of a button assembly according to an embodiment of the present disclosure.

Referring to FIG. 1 and FIG. 2 together, in an embodiment of the present disclosure, the button structure 100 comprises a housing 1, a trigger assembly 2 and a button assembly 3. The housing 1 is provided with a mounting chamber 111, a movable chamber 121 and a button hole 112 communicating with the movable chamber 121, wherein the movable chamber 121 is communicated with the mounting chamber 111. The trigger assembly 2 is provided in the mounting chamber 111. The button assembly 3 comprises a button lever 31 and an operating member 32, wherein the button lever 31 is movably disposed in the movable chamber 121, and a part of the button lever 31 is inserted into the mounting chamber 111 for corresponding to the trigger assembly 2, a rotating groove 315 is provided at an end of the button lever 31 away from the trigger assembly 2, the operating member 32 has a spherical shape, the operating member 32 is movably disposed in the button hole 112, and a part of the operating member 32 is rotatably accommodated in the rotating groove 315. Here, the operating member 32 is pressed to drive the button lever 31 for triggering the trigger assembly 2; and/or the operating member 32 is rotated for triggering the trigger assembly 2.

In the present embodiment, the housing 1 may be a mounting member of the button structure 100 for installing and fixing the trigger assembly 2, the button assembly 3 and other components. Of course, the housing 1 may also be a housing structure of the wearable device 600, and it is not limited herein. It will be understood that the housing 1 provides installation foundation for the trigger assembly 2, the button assembly 3 and other components, and by providing the mounting chamber 111 in the housing 1, it is convenient to use the mounting chamber 111 to install and fix the trigger assembly 2, which does not only protects the trigger assembly 2, but also has a waterproof effect.

It will be understood that the button structure 100 is applied to a device with a button function, the device may be a wearable device 800, an electronic device, or other products that use button functions, such as watches, bracelets, head-mounted displays or the like, and it is not limited herein. In the embodiment, by disposing the button hole 112 on the housing 1, it is convenient for a part of the operating member 32 of the button assembly 3 to pass through the button hole 112 and to protrude outside of the housing 1, it is convenient for the user to apply an external force to the operating member 32 of the button assembly 3, such as pressing and/or rotating the operating member 32 of the button assembly 3, so that the button lever 31 and/or the operating member 32 of the button assembly 3 triggers the trigger assembly 2 to achieve different button functions.

In the embodiment, the trigger assembly 2 is used to trigger the button. The trigger assembly 2 may be structures such as a trigger element, a sensor element, a button or an elastic piece disposed on a circuit board. When the button lever 31 and/or the operating member 32 of the button assembly 3 triggers the trigger assembly 2, the trigger assembly 2 transmits the signal to the circuit board to achieve corresponding control operations, but it is not limited herein.

It will be understood that, by disposing the movable chamber 121 in the housing 1, the movable chamber 121 is communicated with the mounting chamber 111, so that the button lever 31 is movably disposed in the movable chamber 121, and a part of the button lever 31 is inserted into the mounting chamber 111 for corresponding to the trigger assembly 2, so as to facilitate the use of the movable chamber 121 to install and fix the button lever 31 of the button assembly 3. In the embodiment, by providing the rotating groove 315 at an end of the button lever 31 away from the trigger assembly 2, and providing the operating member 32 in a spherical structure, a part of the operating member 32 located in the movable chamber 121 is rotatably accommodated in the rotating groove 315, so that the use of the rotating groove 315 can not only achieve the connection between the operating member 32 and the button lever 31, but also does not interference with the rotating operation of the operating member 32 under the action of external forces.

In the embodiment, the operating member 32 and the rotating groove 315 may be in a hinged rotating fit between a ball head and a spherical groove, so that the operating member 32 can achieve a 360° rotating operation in the rotating groove 315. Of course, the operating member 32 and the rotating groove 315 may also be connected by a magnetic suction structure, so that the magnetic suction structure may be used to connect the operating member 32 and the button lever 31, and the operating member 32 may also be rotated 360° with respect to the rotating groove 315 under the action of external force, and it is not limited herein. It will be understood that the arrangement of the rotating groove 315 can not only realize the rotation of the operating member 32 with respect to the rotating groove 315, but can also avoid problems such as the separation of the operating member 32 from the button lever 31 during the rotation process.

It will be understood that, the spherical outer wall of the operating member 32 is slidably abutted against the groove wall of the rotating groove 315. Of course, in order to prevent the user from misoperation, causing the operating member 32 to slide or rotate with respect to the groove wall of the rotating groove 315, the rotating groove 315 is provided with a sealing layer or damping layer therein, or other structures that can not only achieve the sliding or rotation of the operating member 32 with respect to the groove wall of the rotating groove 315 but also have a certain damping effect may be used, and it is not limited herein.

In the embodiment, the operating member 32 and the rotating groove 315 of the button lever 31 may be connected as an integrated structure by a detachable connection method. For example, snap connection, plug-in fit, suction connection, etc. can be adapted, and it is not limited herein.

In the button structure 100 of the present disclosure, the housing 1 is provided with the mounting chamber 111, the movable chamber 121 and the button hole 112 communicating with the movable chamber 121, so that the mounting chamber 111 is used to mount, fix and protect the trigger assembly 2, and the movable chamber 121 is used to mount and fix the button assembly 3, so that the button lever 31 of the button assembly 3 is movably disposed in the movable chamber 121, and a part of the button lever 31 is inserted into the mounting chamber 111 for corresponding to the trigger assembly 2, the rotating groove 315 is provided at an end of the button lever 31 away from the trigger assembly 2 and the operating member 32 has a spherical shape, so that the operating member 32 is movably disposed in the button hole 112, and a part of the operating member 32 is rotatably accommodated in the rotating groove 315, that is, a part of the operating member 32 of the button assembly 3 passes through the button hole 112 and is exposed outside of the housing 1, so that it is convenient for the user to press and/or rotate the operating member 32 to realize the button operation function. Accordingly, when the operating member 32 is pressed, the operating member 32 drives the button lever 31 to trigger the trigger assembly 2, thereby realizing the button operation function; and when the user rotates the operating member 32, the operating member triggers the trigger assembly 2, thereby realizing the button operation function, such that the button structure 100 has diverse button functions, is convenient for operation, and effectively improves the user experience It will be understood that when the button structure 100 is applied to the wearable device 800, by making the operating member 32 has a spherical structure, the spherical operating member 32 can be rotated 360°, so that the content in the display screen of the wearable device 800 can be scaled and the display page can be slid up and down, the device can also be rotated left and right to slide the display page left and right, and the operating member 32 can also be pressed for function selection, such that interface sliding can be implemented by using the display interface with spherical button rotation, which makes the operation very convenient and interesting.

In an embodiment, the housing 1 comprises a shell 11 and a fixing cover 12, wherein the shell 11 is provided with the mounting chamber 111 and the button hole 112, the fixing cover 12 is disposed in the mounting chamber 111 and covers the button hole 112, and the fixing cover 12 and the shell 11 define the movable chamber 121 communicate with the button hole 112 . . . .

In the embodiment, as shown in FIG. 1, by providing the housing 1 as the shell 11 and the fixing cover 12, the shell 11 provides installation foundation for the trigger assembly 2 and other components. It will be understood that the shell 11 is provided with the mounting chamber 111 therein, and meanwhile, the button hole 112 is provided on the shell 11, that is, the button hole 112 penetrates through an outer wall of the shell 11, and the fixing cover 12 is provided in the mounting chamber 111 and covers the button hole 112, so that the fixing cover 12 and the shell 11 define the movable chamber 121 communicate with the button hole 112, that is, the fixing cover 12 isolates the button hole 112 from the mounting chamber 111.

It will be understood that, by disposing the fixing cover 12 in the mounting chamber 111, on the one hand, the aesthetics of the outside of the shell 11 can be improved, on the other hand, the fixing cover 12 can be used to install and fix the button assembly 3. In the present embodiment, in order to make it easy for the button lever 31 of the button assembly 3 to inserts into the mounting chamber 111 and be used to trigger the trigger assembly 2, the fixing cover 12 is provided with a first through hole 122, the first through hole 122 is communicated with the movable chamber 121 and the mounting chamber 111, so that one end of the button lever 31 away from the rotating groove 315 passes through the first through hole 122 and is inserted into the mounting chamber 111.

In an embodiment, the fixing cover 12 is also provided with a first through hole 122 communicating with the movable chamber 121 and the mounting chamber 111, and the first through hole 122 and the button hole 112 are coaxially disposed. Further, one end of the button lever 31 away from the rotating groove 315 passes through the first through hole 122, and inserts into the mounting chamber 111.

It will be understood that, by disposing the first through hole 122 coaxially with the button hole 112, when the user presses the operating member 32, it is convenient for the operating member 32 to drive the button lever 31 to slide or move along the movable chamber 121 and the first through hole 122, such that the button lever 31 is abutted with the trigger assembly 2 to trigger the button operation.

Optionally, an axis of the button hole 112, an axis of the movable chamber 121 and an axis of the first through hole 122 are located in the same straight line. Of course, in other embodiments, the axis of the button hole 112, the axis of the movable chamber 121 and the axis of the first through hole 122 may also be disposed in parallel, and it is not limited herein. In the present embodiment, the button hole 112 may be selected as a round hole. The first through hole 122 may be selected as a round hole, an oval hole, a square hole, a triangular hole or other polygonal holes or special-shaped holes. It will be understood that the shape profile of the first through hole 122 matches the shape profile of the button lever 31, and it is not limited herein.

In an embodiment, the fixing cover 12 is provided with a second through hole 123 communicating with the movable chamber 121 and the mounting chamber 111, and the second through hole 123 is disposed adjacent to the button hole 112. The button lever 31 is provided with an avoidance opening 316 communicating with the rotating groove 315, and the avoidance opening 316 is disposed corresponding to the second through hole 123.

In the present embodiment, as shown in FIGS. 1 and 2, by disposing the second through hole 123 on the fixing cover 12 and disposing the avoidance opening 316 on the button lever 31, the avoidance opening 316 is disposed corresponding to the second through hole 123, thus the operating member 32 located in the rotating groove 315 corresponds to the trigger assembly 2 through the avoidance opening 316 and the second through hole 123, so that when the user rotates the operating member 32, the trigger assembly 2 triggers the rotation operation by sensing the rotation of the operating member 32.

It will be understood that, the second through hole 123 may be selected as a round hole, an oval hole, a square hole, a triangular hole or other polygonal holes or special-shaped holes, it is not limited herein. The avoidance opening 316 may be a round hole, an oval hole, a square hole, a triangular hole or other polygonal holes or special-shaped holes, and the avoidance opening 316 may be a structure such as a strip-shaped gap or a strip-shaped hole, it is not limited here.

In an embodiment, the fixing cover 12 is provided with an abutting step 124 adjacent to the first through hole 122, the button assembly 3 further comprises an elastic member 33 disposed in the movable chamber 121, one end of the elastic member 33 is elastically abutted to the abutting step 124, and another end of the elastic member 33 is elastically abutted to the button lever 31, wherein when the operating member 32 is pressed, the button lever 31 compresses the elastic member 33.

In the present embodiment, as shown in FIG. 1, by disposing the abutting step 124 in the fixing cover 12, it is convenient to abutted and limited the elastic member 33 by using the abutting step 124. It will be understood that the abutting step 124 is disposed around the first through hole 122, and the abutting step 124 may be selected as a stepped structure or a boss or raised structure, which is not limited herein.

Optionally, the elastic member 33 is a compression spring, a telescopic spring or the like, but it is not limited herein. It will be understood that both ends of the elastic member 33 are elastically abutted to the abutting step 124 and the outer wall of the button lever 31, respectively. A support table or an abutting step may be disposed on the outer wall of the button lever 31, and the support table or the abutting step does not affect the movement of the button lever 31 in the movable chamber 121.

In the present embodiment, the fixing cover 12 may be selected as a cylindrical structure with openings at both ends, or a U-shaped structure with one end opened and another end closed, an opening at one end of the fixing cover 12 may be connected to an inner wall of the shell 11, so that the fixing cover 12 covers the button hole 112. Optionally, the elastic member 33 is a spring, and the elastic member 33 is sleeved on the outer wall of the button lever 31. Of course, in other embodiments, the elastic member 33 is an elastic piece. Thus, the elastic member 33 is located in the movable chamber 121, and the elastic member 33 is elastically abutted to the outer wall or the outer raised portion of the button lever 31.

In an embodiment, the button lever 31 comprises a rod section 311 and a connecting section 314 connected each other, one end of the rod section 311 away from the connecting section 314 passes through the first through hole 122 and inserts into the mounting chamber 111, the connecting section 314 is provided with the rotating groove 315 and the avoidance opening 316, the shape of the rotating groove 315 corresponds to the shape of the operating member 32, and the elastic member 33 is sleeved on the rod section 311 and is elastically abutted to an outer wall of the connecting section 314.

In the present embodiment, as shown in FIGS. 1 and 2, by disposing the button lever 31 as the rod section 311 and the connecting section 314 connected each other, and the rotating groove 315 being provided at one end of the connecting section 314 away from the rod section 311, a notch of the rotating groove 315 corresponds to the button hole 112, so that it facilitates the operating member 32 to inserted into the rotating groove 315 after passing through the button hole 112.

It will be understood that the one end of the rod section 311 away from the connecting section 314 passes through the first through hole 122, and is inserted into the mounting chamber 111 for corresponding to the trigger assembly 2. Optionally, the shape of the rotating groove 315 matches with the shape of the operating member 32, so that it is convenient for the operating member 32 to rotate. In the present embodiment, the elastic member 33 may be selected as a spring, the elastic member 33 is sleeved on the rod section 311, and both ends of the elastic member 33 are elastically abutted to the abutting step 124 and the outer wall of the connecting section 314, respectively.

In the present embodiment, the rod section 311 and the connecting section 314 of the button lever 31 may be selected as an integrated structure, which can improve the structural strength of the button lever 31. A diameter of the connecting section 314 of the button lever 31 is greater than a diameter of the rod section 311, and the connection between the rod section 311 and the connecting section 314 may be formed with a stepped structure or a stopper, to facilitate elastically abutted with the elastic member 33. Optionally, the outer wall of the connecting section 314 has a spherical shape or a hemispherical shape.

In an embodiment, an outer wall of one end of the rod section 311 passing through the first through hole 122 is provided with a slot 312, the button structure 100 further comprises a circlip 4 provided in the mounting chamber 111, the circlip 4 is movably clamped in the slot 312, and when the operating member 32 is pressed, the circlip 4 is movable along a slot wall of the slot 312.

In the embodiment, as shown in FIGS. 1 and 2, by disposing the slot 312 in the rod section 311 and disposing the circlip 4 in the mounting chamber 111, the circlip 4 is movably clamped in the slot 312, so that the pressing stroke of the button lever 31 can be limited by using the circlip 4, avoiding the user from damaging the trigger assembly 2 due to excessive pressing force, or avoiding problems such as poor pressing in a case that the rod section 311 is moved to the movable chamber 121 through the first through hole 122 due to excessive elastic expansion and contraction force of the elastic member 33.

It will be understood that a width of the slot 312 along an extension axis direction of the rod section 311 is greater than a thickness of the circlip 4, as such, when the operating member 32 is pressed, the circlip 4 can move along the slot wall of the slot 312; or when the elastic member 33 is stretched due to compression, the circlip 4 can move along the slot wall of the slot 312, it is not limited herein. Optionally, the slot 312 may be an annular slot, that is, the slot 312 is disposed around a circumference of the outer wall of the rod section 311; and the slot 312 may be a bar slot, and the slot 312 extends along the extension axis direction of the outer wall of the rod section 311, it is not limited herein. In the present embodiment, the circlip 4 has a U-shaped or ring-shaped structure.

In an embodiment, the fixing cover 12 is further provided with a stopper 125 adjacent to the button hole 112, and when the operating member 32 is pressed, the outer wall of the connecting section 314 abuts with the stopper 125 and is stopped by the stopper 12.

In the present embodiment, as shown in FIG. 1, by disposing the stopper 125 on the inner wall of the fixing cover 12, the stopper 125 is used to limit the pressing stroke of the button lever 31, to avoid the user from damaging the trigger assembly 2 due to excessive pressing force. Optionally, the stopper 125 may be a protrusion, a boss or a ring table structure, which is not limited herein.

In an embodiment, the button structure 100 further comprises at least one sealing ring 5, the sealing ring 5 is sandwiched between the button lever 31 and a hole wall of the first through hole 122.

In the present embodiment, as shown in FIGS. 1 and 2, by providing the sealing ring 5 between the rod section 311 of the button lever 31 and the hole wall of the first through hole 122, the sealing ring 5 is used to seal the gap between the rod section 311 of the button lever 31 and the chamber wall of the first through hole 122 of the movable chamber 121, thereby improving the sealing performance and the waterproof performance. Optionally, the material of the sealing ring 5 is NBR.

It will be understood that the sealing ring 5 comprises a plurality of sealing rings, and the plurality of sealing rings 5 are disposed at intervals along the extension direction of the rod section 311 of the button lever 31.

In order to avoid the movement of the sealing ring 5 during the movement of the button lever 31, in an embodiment, as shown in FIGS. 1 and 2, the button lever 31 and/or the hole wall of the first through hole 122 is provided with a groove 313, the sealing ring 5 is accommodated in the groove 313 and partially protrudes from a notch of the groove 313.

In the present embodiment, the groove 313 may be provided on the outer wall of the rod section 311 of the button lever 31, or the groove 313 may be provided on the hole wall of the first through hole 122, or the grooves 313 may be provided correspondingly both on the outer wall of the rod section 311 and the hole wall of the first through hole 122, and it is not limited herein. It will be understood that the sealing ring 5 is elastic and sealable, the sealing ring 5 is accommodated in the groove 313 and partially protrudes from the notch of the groove 313, so that the sealing ring 5 protruding from the notch of the groove 313 can be sealed and abutted with the outer wall of the rod section 311 or the hole wall of the first through hole 122.

Optionally, the groove 313 may be a U-shaped groove, a wedge-shaped groove, a V-shaped groove, an arc-shaped groove, a semicircular groove, etc., and it is not limited here.

In an embodiment, the trigger assembly 2 comprises a circuit board 21, a trigger element 22 and an optical sensor 23. The circuit board 21 is provided in the mounting chamber 111, the trigger element 22 is provided in the mounting chamber 111 and is directly opposite to the first through hole 122, the trigger element 22 is electrically connected to the circuit board 21, the optical sensor 23 is provided on the circuit board 21 and is directly opposite to the second through hole 123, the optical sensor 23 is electrically connected to the circuit board 21.

In the present embodiment, as shown in FIG. 1, the trigger element 22 is provided with a contact piece corresponding to the first through hole 122, and the contact piece faces one end of the rod section 311 of the button lever 31 away from the operating member 32. It will be understood that the trigger element 22 and the optical sensor 23 are electrically connected to the circuit board 21, so that the circuit board 21 is used to receive the trigger signal of the trigger element 22 and the optical sensor 23, for realizing corresponding control function of the trigger signal. Optionally, the circuit board 21 is a flexible circuit board or a hard circuit board, it is not limited herein.

It will be understood that the trigger element 22 may be welded to the flexible circuit board, the flexible circuit board is electrically connected to the circuit board 21, so that the trigger element 22 with a is provided contact piece corresponding to the first through hole 122, and the contact piece faces one end of the button lever 31 away from the operating member 32, thus when an external force is applied to press the operating member 32, the button lever 31 is abutted and pressed to the contact piece for triggering a signal.

In the present embodiment, by disposing the optical sensor 23, the optical sensor 23 is used to detect and identify that the user rotates the operating member 32 to trigger a signal or a function different from that when pressing and triggering the trigger element 22, and the present disclosure is not limited thereto. It will be understood that the optical sensor 23 is provided on the circuit board 21 and is spaced from the trigger element 22, and the optical sensor 23 is used to sense the rotation of the operating member 32 to trigger the trigger assembly 2. Optionally, the optical sensor 23 may be selected as a laser tracking sensor.

It will be understood that a side of the button hole 112 facing the movable chamber 121 is disposed with a flared or tapered hole, that is, the aperture size of the button hole 112 gradually decreases from the side facing the movable chamber 121 to the side of the outer wall of the shell 11, as such, the outer wall of the spherical operating member 32 and the hole wall of the button hole 112 are matched and abutted, which can not only facilitate the rotation of the operating member 32, but also avoid the operating member 32 from separating from the button hole 112.

In an embodiment, the trigger assembly 2 comprises an optical sensor 23, a surface of the operating member 32 is provided with at least one identification area, and the optical sensor 23 is configured to identify the identification area for triggering the trigger assembly 2.

In the present embodiment, by forming the identification area on the surface of the operating member 32, when the operating member 32 is rotated, the identification area of the operating member 32 will rotate and move accordingly, and by using the optical sensor 23 to identify the identification area, the trigger assembly 2 can be triggered.

Optionally, the identification area has a roughness different from that of the surface of the operating member 32, that is, by using the optical sensor 23 to identify the different roughness of the surface of the operating member 32, the trigger assembly 2 can be triggered.

Of course, in other embodiments, the identification area is at least one of text, number, and graphic on the surface of the operating member. It will be understood that, by setting, sticking, coating, spraying or engraving at least one of the text, number, and a graphic on the surface of the operating member, the optical sensor 23 can be used to identify at least one of the text, the number, and the graphic on the surface of the operating member 32 to trigger the trigger assembly 2.

In an embodiment, the wearable device 800 has functions of page scaling, page switching, dial style switching, sports mode switching, physiological detection mode switching and shortcut, the operating member 32 is rotated to trigger the trigger assembly 2 so as to control at least one of the functions of page scaling, page switching, dial style switching, sports mode switching, physiological detection mode switching and shortcut.

In the embodiment, the button structure 100 is applied to the wearable device 800, the wearable device 800 comprises a display screen having a display function page, the wearable device 800 enables the display screen to implement at least one of the functions of page scaling, page switching, dial style switching, sports mode switching, physiological detection mode switching and shortcut through the button structure 100.

It will be understood that when triggering the trigger assembly 2 by rotating the operating member 32, the trigger assembly 2 controls the display screen to realize at least one of the functions of page scaling, page switching, dial style switching, sports mode switching, physiological detection mode switching and shortcut through the control circuit or the control center.

The button structure 100 of the present disclosure can use the spherical operating member 32 to realize the button pressing function, when the user applies an external force to press the operating member 32 protruding from the button hole 112, the operating member 32 drives the button lever 31 to move along the movable chamber 121 and the first through hole 122, at this time, the connecting section 314 of the button lever 31 squeezes the elastic member 33, and the rod section 311 of the button lever 31 is abutted to the trigger element 22 to trigger the button function. When the external force of the user disappears, the elastic member 33 relaxes and pushes the connecting section 314 to drive the operating member 32 to reset, so that the rod section 311 is separated from the trigger element 22. The button structure 100 of the present disclosure can also use the spherical operating member 32 to realize the rotation function, when the user rotates the spherical operating member 32 360°, the operating member 32 rotates in the rotating groove 315, at this time, the optical sensor 23 on the circuit board 21 is activated to realize the recognition function of the spherical button.

Figure 3:
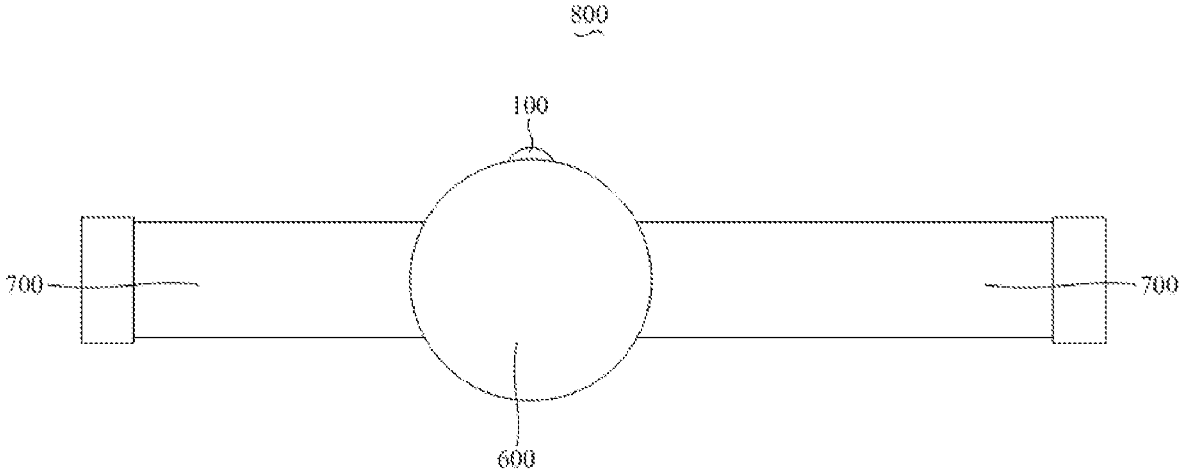
FIG. 3 is a structural schematic view of a wearable device according to an embodiment of the present disclosure.

As shown in FIG. 3, the present disclosure also provides a wearable device 800, the wearable device 800 comprises a device body 600 and the above-described button structure 100, the specific structure of the button structure 100 refers to the aforementioned embodiments. Since the wearable device adopts all the technical solutions of all the aforementioned embodiments, it has at least all the beneficial effects brought about by the technical solutions of the aforementioned embodiments, and it will not be repeated here.

In the embodiment, the housing 1 of the button structure 100 is connected to the device body 600. It will be understood that the wearable device may be watches, bracelets, head-mounted displays, or the like, and when the wearable device is a watch, the device body 600 may be a dial of the watch.

It will be understood that the wearable device 800 comprises a watchband 700, the watchband 700 is connected to opposite sides of the device body 600, and the watchband 700 and the device body 600 define a wearing space for users to wear. In order to facilitate the disassembly of the wearable device 800, the watchband 700 comprises two watchbands 700, the two watchbands 700 are connected to the opposite sides of the device body 600, and the two watchbands 700 may be connected in a detachable manner. Of course, the watchband 700 and the device body 600 may also be connected integratedly by the detachable manner, it is not limited herein.

In the present embodiment, the wearable device 800 further comprises, but is not limited to, a microprocessor module, a screen display module, a battery module, a battery management module, a motor vibration module, etc. located in the device body 600, the circuit board 21 of the button structure 100 is electrically connected to the microprocessor module.

It will be understood that the microprocessor module is used to process the received data, the screen display module is used to display interface information, the battery is used to provide power to the device, and the linear motor module is used for vibration feedback when the dial is switched.

After the wearable device 800 of the present disclosure is turned on, the optical sensor of the trigger assembly 2 starts to work, and the infrared laser generated by a laser generating module inside is irradiated on the spherical operating member 32, the surface of the spherical operating member 32 has a certain roughness, and thus the infrared laser will be reflected. A photosensitive area of the CMOS receiving module has a filter, which only receives the reflected infrared laser and takes photos of the spherical surface, and transmits the photo information to the microprocessor. After rotating the spherical operating member 32, since the surface roughness of the spherical operating member 32 is different, the photos taken by COMS are also different, the microprocessor counts and judges the forward or reverse of the bezel by comparing the differences between the two adjacent images. When the microprocessor recognizes an upward rotation of the spherical operating member 32, it controls the display page to zoom in or switch to a previous page; when the microprocessor recognizes a downward rotation of the spherical operating member 32, it controls the display page to zoom out or switch to a next page; when the microprocessor recognizes a leftward rotation of the spherical operating member 32, it controls the display page to switch to a left one page; and when the microprocessor recognizes a rightward rotation of the spherical operating member 32, it controls the display page to switch to a right one page. For each rotation process, the linear motor will vibrate to remind. In addition, by pressing the spherical operating member 32 to support its pressing operation, when the operating member 32 is pressed so that the button lever 31 triggers the trigger element 22, actions such as page selection will be performed, which is not limited herein.

The above are only optional embodiments of the present disclosure, and are not intended to limit the patent scope of the present disclosure. Within the idea of the present disclosure, all equivalent structural transformations made using the contents of the description and drawings of the present disclosure, or directly/indirectly disclosures in other related technical fields, are comprised in the scope of patent protection of the present disclosure.

What is claimed is:

1. A button structure applied to a wearable device, the button structure comprising:

a housing provided with a mounting chamber, a movable chamber and a button hole communicating with the movable chamber, wherein the movable chamber is communicated with the mounting chamber;

a trigger assembly provided in the mounting chamber; and a button assembly, comprising button shaft and an operating member, wherein the button shaft is movably disposed in the movable chamber, a part of the button shaft is inserted into the mounting chamber for corresponding to the trigger assembly, a rotating groove is provided at an end of the button shaft away from the trigger assembly, the operating member has a spherical shape, the operating member is movably disposed in the button hole, and a part of the operating member is rotatably accommodated in the rotating groove, such that the operating member rotates 360° with respect to the rotating groove, without separation from the rotating groove, wherein the operating member is pressed to drive the button shaft for triggering the trigger assembly; and/or the operating member is rotated for triggering the trigger assembly.

2. The button structure according to claim 1, wherein the wearable device has functions of page scaling, page switching, dial style switching, sports mode switching, physiological detection mode switching and shortcut, the operating member is rotated to trigger the trigger assembly so as to control at least one of the functions of page scaling, page switching, dial style switching, sports mode switching, physiological detection mode switching and shortcut.

3. A wearable device comprising a device body and the button structure according to claim 1, and the housing of the button structure is connected to the device body.

4. The button structure according to claim 1, wherein the housing comprises:

a shell provided with the mounting chamber and the button hole; and a fixing cover disposed in the mounting chamber and covers the button hole, and the fixing cover and the shell define the movable chamber communicating with the button hole.

5. The button structure according to claim 4, wherein the fixing cover is provided with a first through hole communicating with the movable chamber and the mounting chamber, and the first through hole and the button hole are coaxially disposed, and wherein one end of the button shaft away from the rotating groove passes through the first through hole and inserts into the mounting chamber.

6. The button structure according to claim 5, wherein the fixing cover is provided with a second through hole communicating with the movable chamber and the mounting chamber, and the second through hole is disposed adjacent to the button hole.

7. The button structure according to claim 6, wherein the button shaft is provided with an avoidance opening communicating with the rotating groove, and the avoidance opening is disposed at a position corresponding to the second through hole.

8. The button structure according to claim 7, wherein the fixing cover is provided with an abutting step adjacent to the first through hole, and wherein the button assembly further comprises an elastic member disposed in the movable chamber, one end of the elastic member is elastically abutted to the abutting step, and another end of the elastic member is elastically abutted to the button shaft;

wherein, when the operating member is pressed, the button shaft compresses the elastic member.

9. The button structure according to claim 8, wherein the button shaft comprises a rod section and a connecting section connected each other, one end of the rod section away from the connecting section passes through the first through hole and inserts into the mounting chamber, the connecting section is provided with the rotating groove and the avoidance opening, a shape of the rotating groove corresponds to a shape of the operating member, and the elastic member is sleeved on the rod section and is elastically abutted to an outer wall of the connecting section.

10. The button structure according to claim 9, wherein an outer wall of one end of the rod section passing through the first through hole is provided with a slot, the button structure further comprises a circlip provided in the mounting chamber, the circlip is movably clamped in the slot, and when the operating member is pressed, the circlip is movable along a slot wall of the slot, and/or wherein the fixing cover is further provided with a stopper adjacent to the button hole, and when the operating member is pressed, the outer wall of the connecting section abuts with the stopper and is stopped by the stopper.

11. The button structure according to claim 5, wherein the button structure further comprises at least one sealing ring, the sealing ring is sandwiched between the button shaft and a hole wall of the first through hole.

12. The button structure according to claim 11, wherein the button shaft and/or the hole wall of the first through hole is provided with a groove, the sealing ring is accommodated in the groove and partially protrudes from a notch of the groove.

13. The button structure according to claim 6, wherein the trigger assembly comprises:

a circuit board disposed in the mounting chamber;

a trigger element disposed in the mounting chamber and directly opposite to the first through hole, the trigger element is electrically connected to the circuit board; and an optical sensor disposed on the circuit board and directly opposite to the second through hole, the optical sensor is electrically connected to the circuit board.

14. The button structure according to claim 13, wherein a surface of the operating member is provided with at least one identification area, and the optical sensor is configured to identify the at least one identification area for triggering the trigger assembly.

15. The button structure according to claim 14, wherein the identification area has a roughness different from that of the surface of the operating member, or wherein the at least one identification area comprises at least one of text, a number and a graphic on the surface of the operating member.

* * * * *